United States Patent [19]

Udagawa et al.

[11] Patent Number: 5,054,795
[45] Date of Patent: Oct. 8, 1991

[54] METAL LAMINATE GASKET

[75] Inventors: Tsunekazu Udagawa, Ichikawa; Susumu Inamura, Tokyo, both of Japan

[73] Assignee: Ishikawa Gasket Co., Ltd., Tokyo, Japan

[21] Appl. No.: 193,215

[22] Filed: May 11, 1988

Related U.S. Application Data

[63] Continuation of Ser. No. 928,937, Nov. 10, 1986, abandoned.

[51] Int. Cl.⁵ .............................................. F16J 15/08
[52] U.S. Cl. ................................. 277/234; 277/235 B
[58] Field of Search ................... 277/235 B, 233, 234, 277/231, 232, 213

[56] References Cited

U.S. PATENT DOCUMENTS

| | | | |
|---|---|---|---|
| 1,587,626 | 6/1926 | Bailey | 277/235 B X |
| 1,846,402 | 2/1932 | Oven | 277/235 B |
| 2,034,610 | 3/1936 | Dickson | 277/235 B X |
| 2,114,442 | 4/1938 | Fitzgerald | 277/234 X |
| 3,567,234 | 3/1971 | Skrycki | 277/235 B |
| 4,290,616 | 9/1981 | Nicholson | 277/235 B |
| 4,335,890 | 6/1982 | Nicholson | 277/235 B |

FOREIGN PATENT DOCUMENTS

| | | | |
|---|---|---|---|
| 970950 | 10/1958 | Fed. Rep. of Germany | 277/213 |
| 1264901 | 3/1968 | Fed. Rep. of Germany | 277/235 B |
| 2849018 | 5/1980 | Fed. Rep. of Germany | 277/235 B |
| 954327 | 4/1964 | United Kingdom | 277/235 B |

Primary Examiner—Allan N. Shoap
Attorney, Agent, or Firm—Kanesaka and Takeuchi

[57] ABSTRACT

A steel laminate gasket is used for an internal combustion engine having at least one hole therein. The gasket comprises a main plate, and at least one pressure regulation plate. The main plate includes a base section having at least one first opening corresponding to the hole of the engine, a flange situated over the base section around the first opening, and a curved portion situated between the flange and the base section adjacent to the first opening. The curved portion has resiliency to seal around the first opening when the gasket is tightened. The base section, flange and curved portion are integrally formed together. The pressure regulation plate is placed over the base section and includes at least one second opening. The diameter of the second opening is larger than the diameter of the flange so that the pressure regulation plate can be directly placed over the base section without laying over the flange.

6 Claims, 2 Drawing Sheets

METAL LAMINATE GASKET

This application is a continuation of application Ser. No. 928,937, filed Nov. 10, 1986, now abandoned.

BACKGROUND OF THE INVENTION AND RELATED ART STATEMENT

The present invention relates to a steel laminate gasket, more particularly a steel laminate gasket of a very thin type.

A conventional steel laminate gasket is constructed by laminating several plates, and is provided with a complicated sealing portion around a hole to be sealed. Consequently, it is difficult to manufacture a steel laminate gasket with light weight. Also, productivity of a steel laminate gasket is poor. Namely, a steel laminate gasket is much more expensive than other gaskets.

In a small engine, a gasket must be light in weight and be manufactured at a low cost. However, as explained above, a conventional gasket is heavy and expensive, so that a conventional steel laminate gasket is not usually used for a small size engine. Cost and heavy weight prevent a conventional steel laminate gasket from being used in a small size engine.

FIGS. 1 and 2 show conventional steel laminate gaskets. A gasket 10 as shown in FIG. 1 comprises an upper plate 11 having a curved portion 12 and a flange 13, and a lower plate 14, an end of which is situated inside the flange 13. Two inner plates 15, 16 with beads 15a, 16a are situated between the upper and lower plates 11, 14. Also, a plate 17 is situated between the upper plate 11 and the inner plate 15, and a plate 18 is situated between the lower plate 14 and the inner plate 16. A plate 19 is also situated between the inner plates 15, 16.

In this example, seven plates constitute one gasket. Further, this type of gasket requires at least one pressure regulation plate to eliminate excess high pressure at a sealing portion, i.e. an area around the beads 15a, 16a. Namely, the pressure regulation plate receives tightening pressure together with the sealing portion to protect the sealing portion. In this example, the plate 18 operates as a pressure regulation plate. If the gasket 10 is tightened without the plate 18, for example, strong tightening pressure is applied to the sealing portion, so that the sealing portion may, in an extreme situation, be broken.

A gasket 20 as shown in FIG. 2 comprises an upper plate 21 having a curved portion 22 and a flange 23, and a lower plate 24 having a stepped portion 25. A wire 26 is situated around the curved portion 22. Two inner plates 27, 28 and a plate 29 operating as a pressure regulation plate are situated between the upper and lower plates 21, 24. The plate 29 receives tightening pressure together with a sealing portion around the wire 26 to protect the sealing portion.

These conventional steel laminate gaskets are heavy, and include complicated sealing portions. Therefore, these gaskets can not be used for a small size engine with light weight.

Accordingly, one object of the present invention is to provide a steel laminate gasket which is light in weight and simple in structure.

Another object of the present invention is to provide a steel laminate gasket as stated above, which can be easily and economically manufactured.

Further objects and advantages of the present invention will be apparent from the following description of the invention.

SUMMARY OF THE INVENTION

A steel laminate gasket of the present invention is used for an internal combustion engine having at least one hole. The gasket comprises a main plate and at least one pressure regulation plate placed over the main plate. The main plate includes a base section having at least one first opening corresponding to the hole of the engine, a flange situated over the base section around the first opening, and a curved portion situated between the flange and the base section adjacent to the first opening. The curved portion has resiliency to tightly seal around the first opening when the gasket is tightened. The base section, flange and curved portion are integrally formed together.

The pressure regulation plate is provided with at least one second opening, the diameter of which is larger than the diameter of the flange so that the pressure regulation plate can be directly placed over the base section without laying over the flange.

The main plate further includes a space adjacent the curved portion between the base section and the flange to provide resiliency to the curved portion. Also, the flange includes an outer periphery, which touches onto the base section to support the flange at the curved portion and the outer periphery.

DETAILED DESCRIPTION OF PREFERRED EMBODIMENTS

Figure 3:
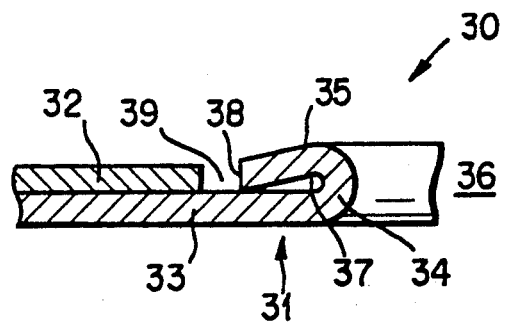
FIG. 3 is a partial section view of a first embodiment of a steel laminate gasket of the present invention.

Referring to FIG. 3, a partial section view of a steel laminate gasket 30 of the present invention is shown, wherein the gasket 30 shown in FIG. 3 is a portion to be situated adjacent to a cylinder bore of an engine to be sealed.

The gasket 30 comprises a main plate 31 extending throughout an entire area of the gasket, and a pressure regulation plate 32 situated above the main plate 31. The main plate 31 includes a flat base portion 33, a curved portion 34 extending upwardly from the base portion 33, and a flange 35 extending from the curved portion 34 to be situated above the base portion 33. The curved portion 34 has resiliency and forms an opening 36, through which a piston (not shown) of an engine reciprocates.

Situated between the base portion 33 and the flange 35 adjacent to the curved portion 34 is a space 37. Since the space 37 is formed between the flange 35 and the base portion 33, when the gasket 30 is tightened, the flange 35 can be pushed toward the base portion 33. The flange 35, therefore, receives sealing action by resiliency of the curved portion 34 retained by the space 37. The sealing pressure is basically obtained by the curved portion 34 and the space 37.

As shown in FIG. 3, an outer periphery 38 of the flange 35 is located above the base portion 33. Consequently, when the gasket 30 is tightened, the flange 35 is supported by the curved portion 34 and the outer periphery 38 situated above the base portion 33. The resiliency of the curved portion 34 is slightly increased by this structure.

The pressure regulation plate 32 includes a hole 39 larger than the outer periphery 38 of the flange 35 and is placed above the base portion 33. The pressure regulation plate 32 does not directly nor indirectly lay over the flange 35.

The pressure regulation plate 32 operates to regulate sealing pressure at a sealing portion around the flange 35 For example, assuming that the tightening pressure and height of the flange 35 are constant, if the thickness of the plate 32 is thick, sealing pressure at the pressure regulation plate is higher than that at the sealing portion on the flange 35. On the other hand, if the thickness of the plate 32 is thin, sealing pressure at the sealing portion is higher than that at the pressure regulation plate. The pressure ratio between the sealing portion and the pressure regulation plate can be changed by selecting the thickness of the pressure regulation plate 32.

Figure 4:
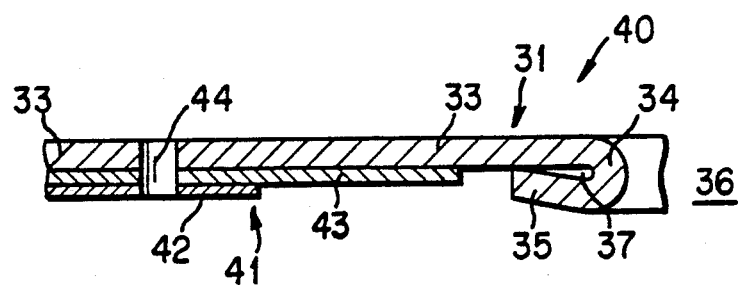
FIG. 4 is a partial section view of a second embodiment of a steel laminate gasket of the invention.

FIG. 4 shows a second embodiment 40 of the steel laminate gasket of the present invention. The gasket 40 comprises the main plate 31 as in the gasket 30, and a pressure regulation plate 41 having two plates 42, 43. In the gasket 40, although the main plate 31 is positioned upside down relative to the gasket 30, the function thereof does not change at all.

The pressure regulation plate 41 comprises two pressure regulation plates 42, 43 for changing thickness of the plate 41 inside the gasket as required. For example, since high sealing pressure is required at the curved portion 34, the pressure regulation plate 43 is only placed at a portion near the opening 36. On the other hand, since high sealing pressure is required around a fluid hole 44, such as a water hole or oil hole, the pressure regulation plate 42 is placed in addition to the plate 43 at a portion near the fluid hole 44.

Further, the pressure regulation plate 42 may be placed on the plate 43 so that an engine block placed above the pressure regulation plate is located exactly parallel to an engine block under the pressure regulation plate. The pressure regulation plate 42 operates to correct bias of the engine block above the pressure regulation plate 42, which may be created by, such as unbalanced position of tightening bolts. The pressure regulation plate 42 may be placed on any place above the plate 43 where high sealing pressure is required.

Figure 5:
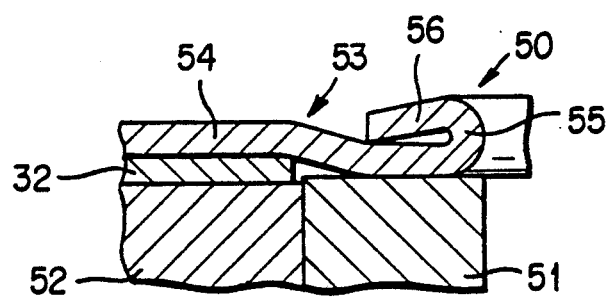
FIG. 5 is a partial section view of a third embodiment of a steel laminate gasket of the invention, wherein the gasket is placed onto an engine.

FIG. 5 shows a third embodiment 50 of the steel laminate gasket of the present invention, wherein the gasket 50 is placed on an engine having a cylinder liner 51 around an engine body 52. The gasket 50 comprises a main plate 53, and the pressure regulation plate 32 as in the gasket 30.

The main plate 53 includes a base portion 54, a curved portion 55 and a flange 56 similar to the main plate 31 as shown in FIG. 3. However, a part of the base portion 54 is slightly bent downwardly, wherein the pressure regulation plate 32 is located under the base portion 54, while the flange 56 is situated above the base portion 54.

The gasket 50 is especially useful for an engine having the cylinder liner 51, because there is a small step between the cylinder liner 51 and the engine body 52. The curved portion 55 and the flange 56 are placed above the cylinder liner 51 to tightly seal around the cylinder liner 51, while the base portion 54 and the pressure regulation plate 32 are placed above the engine body 52. In this structure, the cylinder liner 51 and the engine body 52 can be sealed efficiently.

Figure 1:
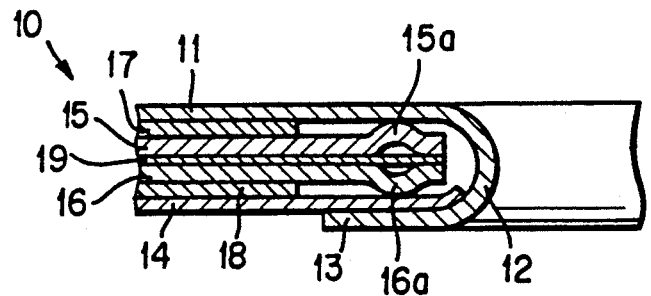
FIGS. 1 and 2 are partial vertical section views of conventional steel laminate gaskets adjacent a hole of an engine.
Figure 2:
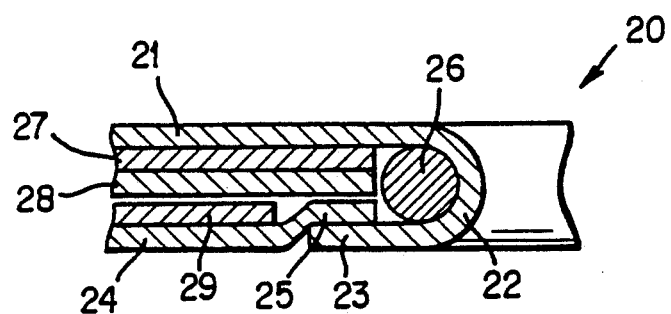

In the conventional gaskets as shown in FIGS. 1 and 2, the gasket requires at least one pressure regulation plate which does not affect sealing ability, so that it is very difficult to form a thin gasket. However, the pressure regulation plate of the present invention operates to regulate pressure at the sealing portion and other portion. The pressure regulation plate of the invention affects the sealing ability as well as regulation of the pressure.

Further, the conventional gasket requires several plates. Therefore, it is very difficult to prepare a gasket with a precise thickness. However, it is possible in the present invention to prepare a gasket with a precise thickness. Further, it is possible to control the thickness of the gasket when the gasket is tightened. In the present invention, the gasket can be used for a small size engine.

While the invention has been explained with reference to the specific embodiments of the invention, the explanation is illustrative and the invention is limited only by the appended claims.

What is claimed is:

1. A meal laminate gasket for an internal combustion engine having at least one hole therein, said gasket consisting essentially of metal and comprising:

a main plate consisting essentially of steel and including a base section having at least one first opening corresponding to the hole of the engine, a flange situated over the base section around the first opening, and a curved portion situated between the flange and the base section to define the first opening and having resiliency to tightly seal around the first opening when the gasket is tightened, and a pressure regulation plate consisting essentially of metal and placed over the base section of the main plate, said pressure regulation plate forming an outer plate of the gasket and having at least one second opening, the diameter of said second opening being larger than the diameter of the flange to permit the pressure regulation plate to be placed over and in direct contact with the base section without laying over the flange, the thickness of the metal pressure regulation plate being thinner than that of the main plate to provide high sealing pressure around the hole of the engine when the gasket is tightened.

2. A steel laminate gasket according to claim 1, in which said pressure regulation plate is disposed on the main plate on the same side of the flange.

3. A steel laminate gasket according to claim 1, in which said pressure regulation plate is disposed on the main plate on the opposite side of the flange.

4. A metal laminate gasket according to claim 1, in which said main plate further includes a space adjacent the curved portion between the base section and the flange to provide resiliency to the curved portion, said flange of the main plate having an outer periphery touching onto the base section to thereby resiliently support the flange at the curved portion and the outer periphery.

5. A metal laminate gasket according to claim 4, in which said pressure regulation plate comprises first and second layers, said first layer being disposed on the base section of the main plate and the second layer being disposed on the first layer.

6. A metal laminate gasket for an internal combustion engine having at least one hole therein, said gasket consisting essentially of metal and comprising:
   a main plate consisting essentially of steel and including a base section having at least one first opening corresponding to the hole of the engine, a curved portion extending outwardly from the base section and returning back to the base section, said curved portion defining the first opening and forming an annular space at a side opposite the first opening to provide resiliency to the curved portion, and a flange extending from the curved portion to be situated over the base section around the first opening, said flange having an outer periphery touching onto the base section so that the flange is resiliently supported by the outer periphery and the curved portion, and
   a pressure regulation plate consisting essentially of metal and placed over the base section of the main plate, said pressure regulation plate forming an outer plate of the gasket and having at least one second opening, the diameter of said second opening being larger than the diameter of the flange to permit the pressure regulation plate to be placed over and in direct contact with the base section without laying over the flange, the thickness of the pressure regulation plate being thinner than that of the main plate to provide high sealing pressure around the hole of the engine, said high pressure being formed substantially by the curved portion of the main plate when the gasket is tightened,
   whereby an area around the hole is securely sealed by the resiliency of the curved portion.

* * * * *